UNITED STATES PATENT OFFICE.

JAMES FREDERICK MOSELEY, OF MANCHESTER, ENGLAND.

INSECTICIDE.

1,395,860.	Specification of Letters Patent.	Patented Nov. 1, 1921.

No Drawing.	Application filed May 18, 1918. Serial No. 235,298.

*To all whom it may concern:*

Be it known that I, JAMES FREDERICK MOSELEY, a British subject, residing at Manchester, county of Lancaster, England, have invented certain new and useful Improvements in Insecticides, of which the following is a specification.

This invention relates to improvements in insecticides.

It is known that halogen substituted hydrocarbons such as tetrachlorethane have an insecticidal value either in solution or emulsion, dilute solutions or suspensions of same being capable of destroying insect life and also the larvæ of the insects.

The present invention consists in the incorporation of tetrachlorethane or other halogen substituted hydrocarbon with an emulsifier, such as alkali salt of a fatty acid or of a sulfonated fatty acid to which is added a diluent such as naphthalene or other coal tar fractions to increase or decrease the value as an insecticide and may then be used either in solution or suspension or the tetrachlorethane or other halogen substituted hydrocarbon may be incorporated with solid bodies in order to be utilized as a dusting medium in powder form.

Or the alkali salts of the elements of the boron and silicon groups may be incorporated with the preparations of tetrachlorethane or other halogen substituted hydrocarbons as these bodies act as solvents and give an increased divisibility of the antiseptic products and also add to the appearance thereof.

The following are typical preparations of tetrachlorethane for use as an insecticide:—

*Example 1.*

60 parts of tetrachlorethane are incorporated with 40 parts of an alkali salt of a fatty acid such as ricinoleic acid or the alkali salt of a sulfonated fatty acid such as ricinoleic acid as an emulsifier. The resulting product is miscible with water and is capable of destroying insects and their eggs or larvæ when mixed with water in the proportion of 1 part to 8,000 parts of water.

*Example 2.*

60 parts of naphthalene are dissolved in 80 parts of tetrachlorethane and the resulting solution incorporated with 60 parts of emulsifier such as an alkali salt of a fatty acid or of a sulfonated oil and the resultant product used as a solution after dilution with water. The naphthalene has the effect of decreasing the destroying action of the tetrachlorethane.

*Example 3.*

1,000 parts of tetrachlorethane are mixed with 50 parts of naphthalene, cresol or other hydrocarbon to reduce the action of the tetrachlorethane and the mixture added to and thoroughly mixed with 100 parts of a saponaceous base. An alkali borate or silicate such as potassium borate or sodium silicate may be added to the saponaceous base before the tetrachlorethane mixture is added thereto.

An example of a preparation utilizing a solid diluting agent is as follows:—

100 parts of naphthalene or other coal tar fractions, are dissolved in 1,000 parts of chlorinated hydrocarbon such as tetrachlorethane, or one of its homologues. This is incorporated with 100 parts of saponaceous base, to which has been added an alkali borate or silicate. The whole is then incorporated with 24,000 parts of diatomaceous earth and thoroughly mixed, when an insecticide having a very large surface area and a very high co-efficient is obtained.

Oil of rosemary or other essential oil or aromatic oils or products of plants may be employed to cover up the odor of the tetrachlorethane or other halogen substituted hydrocarbon when the same is not desired. Such addition in many cases will also add to the antiseptic properties of the final production.

The oil may be added in any examples given above and is preferably added to the tetrachlorethane mixture before the latter is added to the emulsifier.

What I claim as my invention and desire to protect by Letters Patent is:—

1. An insecticide comprising tetrachlorethane incorporated with an alkali salt of a fatty acid, and a solvent alkali salt to increase the divisibility of the antiseptic products.

2. An insecticide comprising tetrachlorethane incorporated with an alkali salt of a fatty acid, naphthalene, and an alkali salt having the function of increasing the divisibility of the antiseptic products.

3. An insecticide comprising tetrachlorethane incorporated with an alkali salt of a fatty acid, a solvent alkali salt having the function of increasing the divisibility of the antiseptic products, and a powdered material.

4. An insecticide comprising tetrachlorethane incorporated with an alkali salt of a fatty acid, a solvent alkali salt, and an aromatic substance to cover up the odor of the tetrachlorethane.

In testimony whereof I have hereunto set my hand in presence of two subscribing witnesses.

JAMES FREDERICK MOSELEY.

Witnesses:
  I. OWDEN O'BRIEN,
  GEO. H. O'BRIEN.